Jan. 8, 1929.
S. J. V. BOVEY
1,698,490
CONTROL DEVICE
Filed June 11, 1926
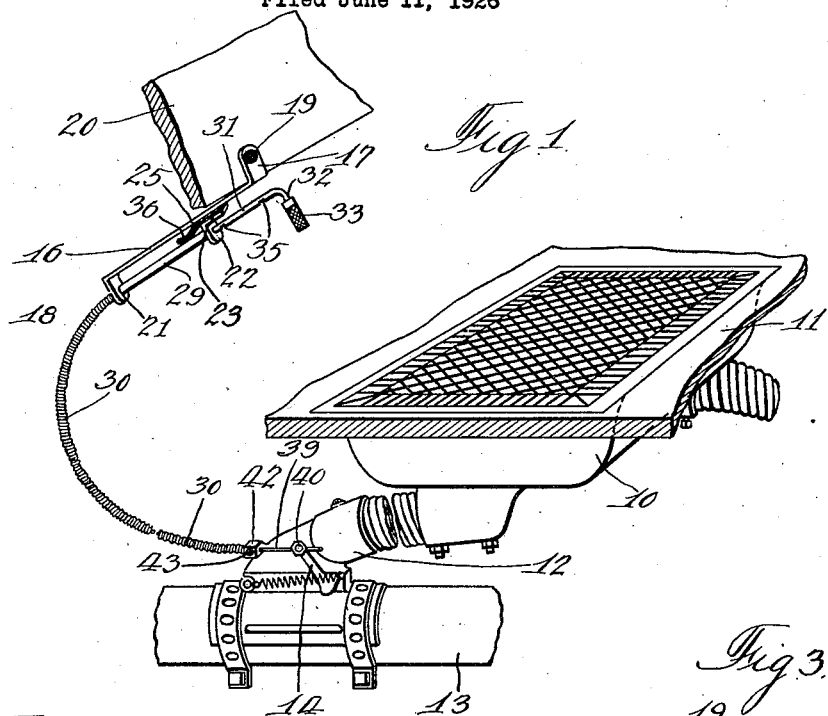
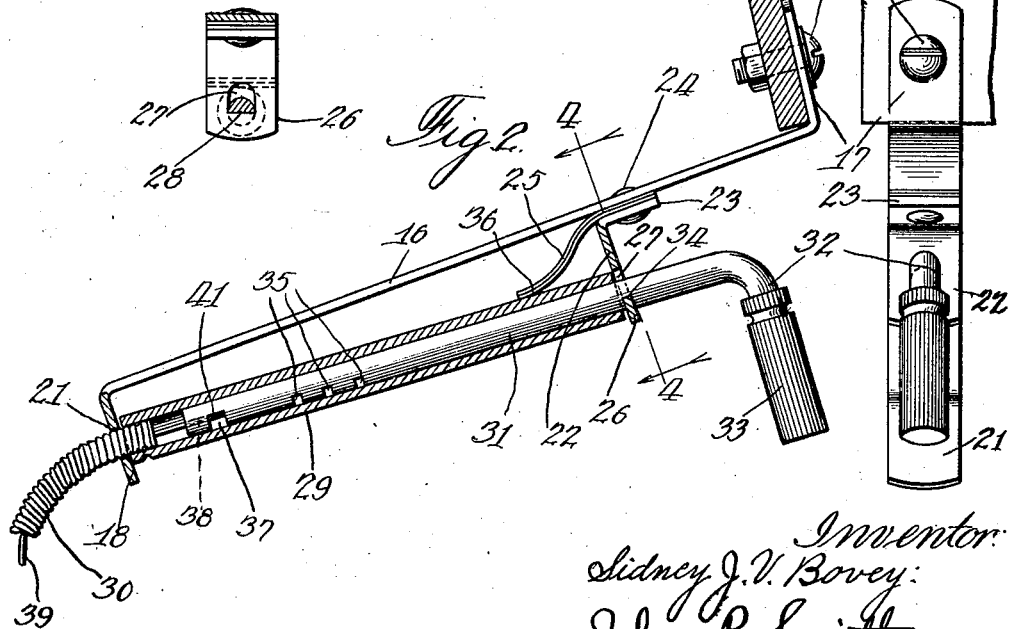
Inventor:
Sidney J. V. Bovey
By John P. Smith
Atty Patented Jan. 8, 1929.

1,698,490

UNITED STATES PATENT OFFICE.

SIDNEY J. V. BOVEY, OF CHICAGO, ILLINOIS.

CONTROL DEVICE.

Application filed June 11, 1926. Serial No. 115,271.

This invention relates to a control mechanism and is particularly adapted for use in connection with controlling the position or the adjustment of the valve for vehicle heaters, carburetors, exhaust cut-outs, ventilators and shutters of radiator covers and the like for automobiles.

One of the objects of the present invention is to provide a simple and efficient control mechanism which may be operatively connected to various contrivances of a vehicle which can easily be controlled from the dash board of the vehicle.

A further object of the invention is to provide a simple control mechanism which positively locks the parts in their adjusted positions.

A still further object of the invention is to provide a control mechanism which may be readily attached to the instrument board of the vehicle.

These and other objects are accomplished by providing a construction and an arrangement of the parts in the manner hereinafter described and particularly pointed out in the appended claims.

Referring to the drawings, in which

Figure 1 is a side elevational and diagrammatic view showing my improved control device operatively connected up with the fly valve of a heater for a vehicle;

Figure 2 is an enlarged side elevational view showing the construction of my improved control mechanism;

Figure 3 is an end elevational view of the same; and

Figure 4 is a cross sectional view taken on the line 4—4 in Figure 2 showing the construction of the locking mechanism for securing the control against movement.

In illustrating one embodiment of my invention I have shown the same in connection with the control fly valve of a heater for a vehicle. It will of course be understood that the same is capable of use in connection with various other parts of an automobile such, for instance, as the carburetor control, exhaust cut-out, ventilators and shutters for radiator front and the like.

In Figure 1 of the drawing I have shown the well known type of heater 10 which is mounted in the floor 11 of the vehicle. Communicating with the heater 10 is the usual conduit 12 which in turn communicates with the exhaust pipe 13. Mounted in the opening forming the communication between the exhaust pipe 13 and the conduit 12 is a fly valve, not shown. Operatively connected with the fly valve in a manner well known in the art is a pivoted lever 14. My improved control device comprises a bracket 16 which is preferably made of a flat piece of steel and has its opposite ends as shown at 17 and 18 bent at right angles with respect to the main body portion of the bracket and preferably in opposite directions. The right angularly bent portion 17 of the bracket 16 is provided with an aperture which is adapted to receive a securing bolt 19 for securing the bracket to the instrument board 20, only a part of which is shown, of the vehicle. The other right angularly bent portion 18 is provided with an aperture 21 for the purpose hereinafter described. Secured to the main body portion of the bracket 16, preferably adjacent its upper end, is a supplemental bracket 22. The supplemental bracket 22 has a right angularly bent portion 23 which in turn is secured to the main body portion of the bracket 16 by means of a rivet 24. Interposed between the right angularly bent portion 23 of the supplemental bracket 22 and main body portion of the bracket 16 are flat springs 25. These springs are secured in position by the rivet 24 which secures the supplemental bracket to the main bracket. The downwardly extending portion, as shown at 26, of the supplemental bracket 22 is provided with an aperture 27 which has the upper portion thereof in the form of a semi-circle and its lower portion as shown at 28 flattened or in the form of a straight line so as to form a locking means for the rod hereinafter described. Mounted between the right angularly bent portion 18 of the main bracket 16 and the downwardly extending portion 26 of the supplemental bracket 22 is a guiding member 29 in the form of a tube. The forward end of the guiding member or tube 29 telescopically receives a flexible tubular member or mono-coil 30. The flexible tube is secured to the guiding member 29 by having the guiding member compressed or squeezed onto the flexible member after the flexible member has been inserted. The flexible member is then inserted in the aperture 21 of the right angularly disposed portion 18 of the bracket 16 as clearly shown in Fig. 2. Mounted for reciprocable movement in the guiding member or tube 29 is an adjustable bar or rod 31. The adjustable bar or rod 31 is provided adjacent its upper end with a right angularly bent portion 32 which has secured thereon a handle 33. The reciprocating bar or rod 31 is provided with a notch 34 adjacent its upper end which is slightly larger than the thickness of the material of the downwardly extending portion 26 of the supplemental bracket 22 so that the notch 34 will freely engage the portion 28 of the supplemental bracket. Adjacent the lower end of the reciprocating bar or rod 31 is a plurality of similar notches 35 of which there may be as many as desired for locking the reciprocating rod against movement with respect to the bracket. The springs 25 are preferably in the form of two reverse curves with the lower ends as shown at 36 engaging the upper surface of the guiding member or tube 29 so as to press the guiding member as well as the reciprocating rod or bar 31 downwardly with respect to the bracket.

From the above description it will be seen that the pressure of the springs 25 normally presses the guiding member 29 and reciprocating rod 31 downwardly with respect to the bracket so that one of the notches 34 and 35 of the reciprocating rod 31 will be pressed into engagement when they register with the locking portion 28 of the supplemental bracket 22 as the reciprocating bar 31 is adjusted. In order to release the reciprocating bar or rod 31 from its locked position on the bracket, the handle 33 may be gripped and raised against the pressure of the springs 25 so that the upper portion of the bar or rod 31 engages the semi-circular portion of the aperture 27 and the reciprocating bar may then be moved within the guiding member 29 to the desired adjustment; or the adjusting rod 31 may be swung by turning the handle 33 through an arc of 90 degrees so that the curved surface of the bar 31 may ride on the flat or straight portion 28 of the aperture and when the desired adjustment is attained may be locked in one of the notches 35 onto the locking portion of the supplemental bracket 22. The lower end of the reciprocating rod or bar 31 is provided with a transverse slot 37. Communicating with the slot 37 and extending longitudinally of the reciprocating rod 31 is an aperture 38. Extending through the flexible tubing 30 is a wire 39 which is preferably a piano wire and has one end thereof as shown at 40 secured by any suitable means to the free end of the lever 14 of the fly valve. The other end of the wire extends through the flexible tube and is connected to the reciprocating rod or bar 31 by having this end extending through the aperture 38, thence into the recess 37 where the end of the wire is bent as shown at 41 and thereby securing the wire against displacement from the reciprocating bar or rod 31. The lower end of the flexible tubing 30 is secured against movement with respect to the conduit 12 in a lug 42. This lug 42 has an aperture extending therethrough for the reception of the lower end of the tubing 30. The tubing is secured against displacement from the lug by a set screw 43.

From the above it will be seen that by manipulating the handle 33 of the reciprocating bar 31; that is, by raising it and compressing the springs 25 the reciprocating rod may be adjusted and locked in various positions of adjustment.

From the above description it will be readily seen that I have provided a very simple construction which is economical to manufacture and at the same time have provided a controlling device which effectively secures the part to which it is connected in various positions of adjustment.

While in the above specification I have described one embodiment and one modification of my invention, it will of course be understood that the same is capable of modification and that modification may be made without departing from the spirit and scope of the invention as expressed in the following claims.

What I claim as my invention and desire to secure by Letters Patent is:

1. A control mechanism comprising a bracket, a movable guiding member carried by said bracket, a reciprocating bar mounted on said bracket and guided by said guiding member, said bar having a plurality of spaced apart notches adapted to engage said bracket, and means for normally pressing said bar to lock said rod against adjustment with respect to said bracket.

2. A control mechanism comprising a bracket, a movable guiding means carried by said bracket, a reciprocating bar mounted in said guiding means, locking means on said bracket and adapted to engage said bar, and a spring positioned between said bar and said bracket for normally actuating said bar into engagement with said locking means.

3. A control device comprising a bracket having two substantially right angularly disposed portions on the opposite ends thereof and extending in opposite directions with respect to each other, a supplemental bracket secured to said first named bracket, a guiding member mounted on said bracket, a reciprocating bar mounted in said guiding member, there being a plurality of notches formed in said reciprocating bar adapted to engage said supplemental bracket, and spring means mounted on said bracket normally pressing said reciprocating bar downwardly with respect to said bracket.

4. A control mechanism comprising a bracket having two substantially right angularly extending portions on the opposite ends thereof and extending in opposite directions with respect to each other, a supplemental bracket mounted intermediate the ends of said first named bracket, a movable guiding member carried by said bracket, a reciprocating bar extending through said supplemental bracket and said guiding member, and means formed on said reciprocating bar adapted to engage said supplemental bracket for locking said reciprocating bar in various positions of adjustment.

5. A control device comprising a bracket having two substantially right angularly disposed portions on the opposite ends thereof and extending in opposite directions with respect to each other, a supplemental bracket secured to said first named bracket, a guiding member mounted between one of said right angularly bent portions of said main bracket and said supplemental bracket, a reciprocating bar extending through said supplemental bracket and through said guiding member, and spring means mounted on said bracket and engageable with said guiding member for normally pressing said reciprocating bar downwardly with respect to said bracket.

6. A control device comprising a bracket, right angularly disposed portions formed on the opposite ends of said bracket, a supplemental bracket secured intermediate the ends of said first named bracket, a guiding member adapted for movement with respect to said bracket positioned between one of the ends of said main bracket and said supplemental bracket, a spring mounted between said main bracket and said supplemental bracket for normally pressing said guiding member outwardly with respect to said main bracket, and a reciprocating rod mounted in said supplemental bracket and extending into said guiding member and having notches thereon whereby said spring may lock said reciprocating rod with respect to said bracket.

7. A control mechanism comprising a bracket formed from a flat strip, a tubular guiding member secured to said bracket, a reciprocating bar mounted in said guiding member, there being a plurality of notches in said bar, and means secured to said bracket engageable with said guiding member for normally pressing said bar downwardly with respect to said bracket.

8. A control mechanism comprising a bracket, a tubular guiding member having one end secured to said bracket and the other end movable with respect thereto, a reciprocating bar mounted in said tubular member, there being a plurality of notches in said bar, and spring means mounted on said bracket and engageable with said tubular member for normally pressing said bar downwardly with respect to said bracket.

In testimony whereof I have signed my name to this specification on this 19th day of May, A. D. 1926.

SIDNEY J. V. BOVEY.